Patented June 1, 1948

2,442,663

UNITED STATES PATENT OFFICE 2,442,663

MEAT CURING

Cleo A. Rinehart, Chicago, Ill., assignor to Industrial Patents Corporation, Chicago, Ill., a corporation of Delaware No Drawing. Application October 29, 1943, Serial No. 508,253

5 Claims. (Cl. 99—159)

This invention relates to the curing of meat and has to do particularly with an improvement in the curing of meat by the dry cure method.

In the curing of high grade meat such as bacon by the dry cure method, it is customary to pack bacon bellies in layers in boxes and to sprinkle the curing salts over and around each layer. Such curing salts may comprise sodium chloride, sodium nitrate, sodium nitrite and sugars. The sodium chloride and sodium nitrate have a curative effect on the meat. A portion of the nitrate may be reduced by the bacteria to the nitrite. The nitrite has the effect of imparting the characteristic red color to the cured product. The sugars along with the salts give the desired flavors.

The dry cure method has the advantage over the wet cure, wherein the meat is immersed in a salt brine, in that there is no wetting and absorption of moisture by the meat. Moreover, the dry cure method generally produces a better flavor and color than the wet cure method.

There is often difficulty in the dry salt cure method in obtaining an even cure throughout the mass of meat and in securing uniformity of cure from one batch to another. For example, batches treated in substantially the same manner may have different colors, and sometimes streakiness may occur in a single batch. This difficulty is attributed to the uneven contact of the curing agent with the meat and the failure of the desired bacterial changes in connection with the curing salt. Thus the curing salts may accumulate in pockets, presenting certain areas wherein the action of the salts or the action of the bacteria may be unduly strong. Also, the salts may absorb moisture causing solutions of varying concentration which accumulate in or run over certain areas causing a different curing action than in other areas.

An object of the present invention is to provide an improved dry cure reagent.

Another object of the invention is to provide an improved dry cure method which will produce a uniformly cured product.

A further object of the invention is to provide a dry curing reagent which will cause a substantially constant curing action, regardless of the moisture content of the meat with which it contacts.

A further object of the invention is to provide a dry curing agent which will absorb large amounts of moisture without running or substantially changing the physical character of the reagent.

A further object of the invention is to provide a medium which will uniformly present the curing salts to the surface of the meat and which will permit diffusion of moisture therethrough and transmission of the curing salts into the meat evenly and in substantially uniform strength.

A further object of the present invention is to produce a curing reagent in dry form which has the advantages of a brine cure reagent without the disadvantage of the wetting action characteristic of a liquid curing agent.

In the patent to Urbain, U. S. No. 2,180,750, there is disclosed a method of curing meat in which the curing salts are used in the form of a paste comprising starch. While this method has certain advantages, it is more difficult to handle than a dry mixture. Also its moisture absorbing properties are limited. Moreover, the large amount of starch required presents opportunities for development of fermentation and peculiar flavors.

The patent to Griffith, U. S. No. 2,054,626, discloses the crystallization of the dry curing salts in the presence of certain protective colloids including gelatin to produce a more uniform mixture than would be produced from crystallizing a straight solution of the salts. The protective colloid retards crystallization and effects a more even distribution of crystals. The protective colloid is used in such small amounts that it would be ineffective for the purposes of the present invention.

In accordance with the present invention, the curing agent comprises a dry mixture of gelatin and the curing reagents. The gelatin is incorporated with certain of the other ingredients prior to the drying of the gelatin. A preferred procedure is to dissolve the gelatin in warm water to form a gelatin liquor and to add the nitrate or nitrite or both to the liquor. It is necessary to adjust the pH of the gelatin liquor to a point above the decomposition point of sodium nitrite, for example, about 6.8 to 7.0. The gelatin liquor is then chilled to a gel, dried and ground. The mixture of dried gelatin, nitrite and/or nitrate mixture may be mixed with the other dry ingredients although the other ingredients may also be added to the gelatin liquor prior to drying.

A suitable formula, for example, may be:

| | Pounds |
|---|---|
| Gelatin | 160 |
| Sodium nitrite | 3 |
| Sodium nitrate | 30 |
| Salt | 360 |
| Sugar | 240 |

In the above formula, the gelatin is present in an amount equal to approximately 20 per cent by weight of the mixture. I do not intend to confine myself to this amount since any amount which will absorb liquids, such as brine forming from the juices of the meat and the salts, and will hold the curing agents in place may be used. I contemplate, for example, using at least 10 per cent gelatin. The upper limit in the amount of gelatin may vary but in practice, over 25 per cent is ordinarily not required.

The gelatin powdered mixture may be applied in substantially the same manner as regular dry cure salts without the gelatin. The gelatin mixture, however, produces quite different results.

The gelatin mixture swells in cold water, absorbing many times its own weight of moisture. The absorption of moisture prevents the development of a curing brine which would settle into pockets in the bacon. It also retains meat juices and avoids local high concentration of the curing brine. Moreover, the fragments of the gel are composed of a semi-permeable membrane through which the curing salts can diffuse into the bacon without producing abnormally high concentrations at any point.

Obviously, many modifications and variations of the invention hereinbefore set forth may be made without distinguishing from the spirit and scope thereof, and therefore, only such limitations should be imposed as are indicated in the appended claims.

I claim:

1. The method of preparing a meat curing reagent which comprises forming a gelatin liquor, adding to the liquor curing salts in proportion such that the gelatin amounts to at least about 10 per cent and not over about 25 per cent based on the dry mixture, and drying the mixture.

2. The method of preparing a meat curing reagent which comprises adding curing salts to a gelatin liquor so that the gelatin equals not less than 10 per cent and not over about 25 per cent based on the dry mixture, drying the mixture, grinding the dry product and incorporating into the ground product salt and sugar.

3. A method of curing meat to produce uniform curing by preventing migration of the curing reagent on the surface of the meat which comprises, forming a solution of gelatin containing sodium nitrite, drying the solution, combining the resulting dry material with the other curing salts in such proportions that the gelatin amounts to about 10 per cent to 25 per cent of the total weight of the mixture and applying said mixture to the surface of the meat whereby the gelatin absorbs moisture from the surface of the meat and prevents local high concentration of curing brine.

4. A dry meat curing reagent comprising particles of meat curing salts including salt and sugar and particles of a mixture containing dried gelatin and sodium nitrite, the gelatin amounting to about 10 per cent to 25 per cent of the total reagent.

5. A method of preparing a meat curing reagent which comprises forming a gelatin liquor containing sodium nitrite, drying the liquor and combining the resulting product with the remaining ingredients comprising salt and sugar in such proportions that the gelatin amounts to about 10 to 25 per cent of the total reagent.

CLEO A. RINEHART.

REFERENCES CITED

The following references are of record in the file of this patent:

UNITED STATES PATENTS

| Number | Name | Date |
|---|---|---|
| 1,208,175 | Lipman | Dec. 12, 1916 |
| 2,054,626 | Griffith | Sept. 15, 1936 |
| 2,180,750 | Urbain | Nov. 21, 1939 |